US012162283B2

(12) United States Patent
Asai et al.

(10) Patent No.: US 12,162,283 B2
(45) Date of Patent: Dec. 10, 2024

(54) LIQUID EJECTION HEAD AND PROCESS FOR PRODUCING LIQUID EJECTION HEAD

(71) Applicant: CANON KABUSHIKI KAISHA, Tokyo (JP)

(72) Inventors: Kazuhiro Asai, Kawasaki (JP); Koji Sasaki, Nagareyama (JP); Jun Yamamuro, Yokohama (JP); Shingo Nagata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/517,459

(22) Filed: Nov. 22, 2023

(65) Prior Publication Data

US 2024/0083167 A1 Mar. 14, 2024

Related U.S. Application Data

(62) Division of application No. 17/392,419, filed on Aug. 3, 2021, now Pat. No. 11,938,729, which is a division (Continued)

(30) Foreign Application Priority Data

Sep. 6, 2018 (JP) ................................ 2018-166888

(51) Int. Cl.
*B41J 2/14* (2006.01)
*B41J 2/16* (2006.01)

(52) U.S. Cl.
CPC ....... *B41J 2/14201* (2013.01); *B41J 2/14072* (2013.01); *B41J 2/1607* (2013.01);

(Continued)

(58) Field of Classification Search
CPC .................................................... B41J 2202/20
See application file for complete search history.

(56) References Cited

U.S. PATENT DOCUMENTS 4,884,086 A * 11/1989 Kirk .......................... B41J 2/45
346/139 R
5,198,054 A 3/1993 Drake et al.

(Continued)

FOREIGN PATENT DOCUMENTS

CN 101054021 A 10/2007
CN 101152789 A 4/2008

(Continued)

OTHER PUBLICATIONS

Extended European Search Report dated Jan. 30, 2020, in European Patent Application No. 19191399.5.

(Continued)

*Primary Examiner* — Shelby L Fidler
(74) *Attorney, Agent, or Firm* — Venable LLP

(57) ABSTRACT

A liquid ejection head includes a base plate and at least two device chips in which ejection ports for ejecting a liquid are formed and which are disposed on the base plate. At least one first reference mark is provided on the base plate. A second reference mark is provided on each of the device chips. At least one space is formed between adjacent device chips. The second reference marks and the first reference mark present in the space are disposed on an array axis along which the device chips are arrayed.

9 Claims, 6 Drawing Sheets

Related U.S. Application Data of application No. 16/536,675, filed on Aug. 9, 2019, now Pat. No. 11,097,540.

(52) U.S. Cl.
CPC .... *B41J 2/1623* (2013.01); *B41J 2002/14491* (2013.01); *B41J 2202/19* (2013.01); *B41J 2202/20* (2013.01)

(56) References Cited

U.S. PATENT DOCUMENTS

| | | | | |
|---|---|---|---|---|
| 6,119,334 | A | 9/2000 | Watanabe et al. | |
| 6,137,506 | A * | 10/2000 | Sueoka | B41J 2/155 347/47 |
| 6,350,013 | B1 | 2/2002 | Scheffelin et al. | |
| 7,850,287 | B2 | 12/2010 | Iwao et al. | |
| 9,233,537 | B2 | 1/2016 | Hayashi | |
| 9,248,647 | B2 | 2/2016 | Iwanaga et al. | |
| 9,895,892 | B2 | 2/2018 | Yoshiike | |
| 10,434,776 | B2 | 10/2019 | Furukawa | |
| 2004/0179061 | A1 | 9/2004 | Akahane | |
| 2005/0239229 | A1 | 10/2005 | Imai et al. | |
| 2006/0274100 | A1 | 12/2006 | Uji et al. | |
| 2007/0126841 | A1* | 6/2007 | Hibbard | B41J 2/17553 347/108 |
| 2007/0165077 | A1 | 7/2007 | Tanikawa et al. | |
| 2008/0062223 | A1 | 3/2008 | Enomoto et al. | |
| 2009/0189949 | A1 | 7/2009 | Wu | |
| 2009/0231393 | A1 | 9/2009 | Mizoguchi | |
| 2010/0046007 | A1* | 2/2010 | Tharion | B41J 2/1639 356/614 |
| 2011/0020965 | A1 | 1/2011 | McAvoy et al. | |
| 2012/0181666 | A1 | 7/2012 | Takahashi et al. | |
| 2013/0070024 | A1 | 3/2013 | Prashar et al. | |
| 2015/0052752 | A1 | 2/2015 | Sakai et al. | |
| 2015/0158301 | A1* | 6/2015 | Togashi | B41J 2/14233 347/32 |
| 2015/0197090 | A1 | 7/2015 | Akahane | |
| 2015/0328890 | A1 | 11/2015 | Moriya et al. | |
| 2017/0066266 | A1 | 3/2017 | Yoshiike | |
| 2017/0274653 | A1 | 9/2017 | Shimazoe et al. | |
| 2017/0282553 | A1* | 10/2017 | Hayashi | B41J 2/145 |
| 2018/0178511 | A1 | 6/2018 | Kashimura | |
| 2019/0143684 | A1 | 5/2019 | Yamamoto et al. | |
| 2019/0217616 | A1 | 7/2019 | Mu et al. | |

FOREIGN PATENT DOCUMENTS

| | | | |
|---|---|---|---|
| CN | 101823367 | A | 9/2010 |
| CN | 102582263 | A | 7/2012 |
| CN | 104339849 | A | 2/2015 |
| CN | 104772987 | A | 7/2015 |
| CN | 106715127 | A | 5/2017 |
| EP | 1186416 | A2 | 3/2002 |
| JP | 59-164161 | A | 9/1984 |
| JP | 2002-086695 | A | 3/2002 |
| JP | 2008-94000 | A | 4/2008 |
| JP | 2016-221923 | A | 12/2016 |
| JP | 2017-094712 | A | 6/2017 |

OTHER PUBLICATIONS

Office Action dated Mar. 3, 2021, in Chinese Patent Application No. 201910825030.9.

Office Action dated Sep. 1, 2021, in Chinese Patent Application No. 201910825030.9.

Office Action dated Jun. 28, 2022, in Japanese Patent Application No. 2018-166888.

* cited by examiner

LIQUID EJECTION HEAD AND PROCESS FOR PRODUCING LIQUID EJECTION HEAD

BACKGROUND OF THE DISCLOSURE

Field of the Disclosure

The present disclosure relates to a liquid ejection head and a process for producing a liquid ejection head.

Description of the Related Art

Liquid ejection apparatuses such as inkjet printing apparatuses use a liquid ejection head. In the liquid ejection head, a device chip having a plurality of ejection ports is disposed. In recent years, liquid ejection heads in which a plurality of device chips are disposed in a line to achieve a wider print width have been used.

The specification of U.S. Patent Application Publication No. 2011/0020965 (hereinafter referred to as document 1) discloses an IC chip shape to dispose the IC chips of a print head in a line, and a layout of each IC chip and a flow path unit relative to each other. Specifically, document 1 discloses that a plurality of IC chips 100 are arrayed in a line with no clearance therebetween, as shown in FIG. 2 of document 1. (In the foregoing and following description, the reference numerals used in document 1 are referenced herein.) Also, as shown in FIG. 11 of document 1, the IC chips 100 are positioned using reference marks 103A on the IC chips 100 and reference marks 103B on a channel molding 124 having a liquid flow path structure.

In document 1, since the IC chips 100 are arrayed in a line with no clearance therebetween, the reference marks 103B on the channel molding 124, having a liquid flow path structure, cannot be disposed on an array axis extending in the array direction of the plurality of IC chips 100. For this reason, the accuracy of the positioning of the adjacent chips may possibly be lowered.

SUMMARY OF THE DISCLOSURE

A liquid ejection head according to an aspect of the present disclosure is a liquid ejection head comprising abase plate and at least two device chips in which ejection ports for ejecting a liquid are formed and which are disposed on the base plate. At least one first reference mark is provided on the base plate. A second reference mark is provided on each of the device chips. At least one space is formed between adjacent ones of the device chips. The second reference marks and the first reference mark present in the space are disposed on an array axis along which the device chips are arrayed.

Further features of the present disclosure will become apparent from the following description of exemplary embodiments with reference to the attached drawings.

DESCRIPTION OF THE EMBODIMENTS

Figure 1:
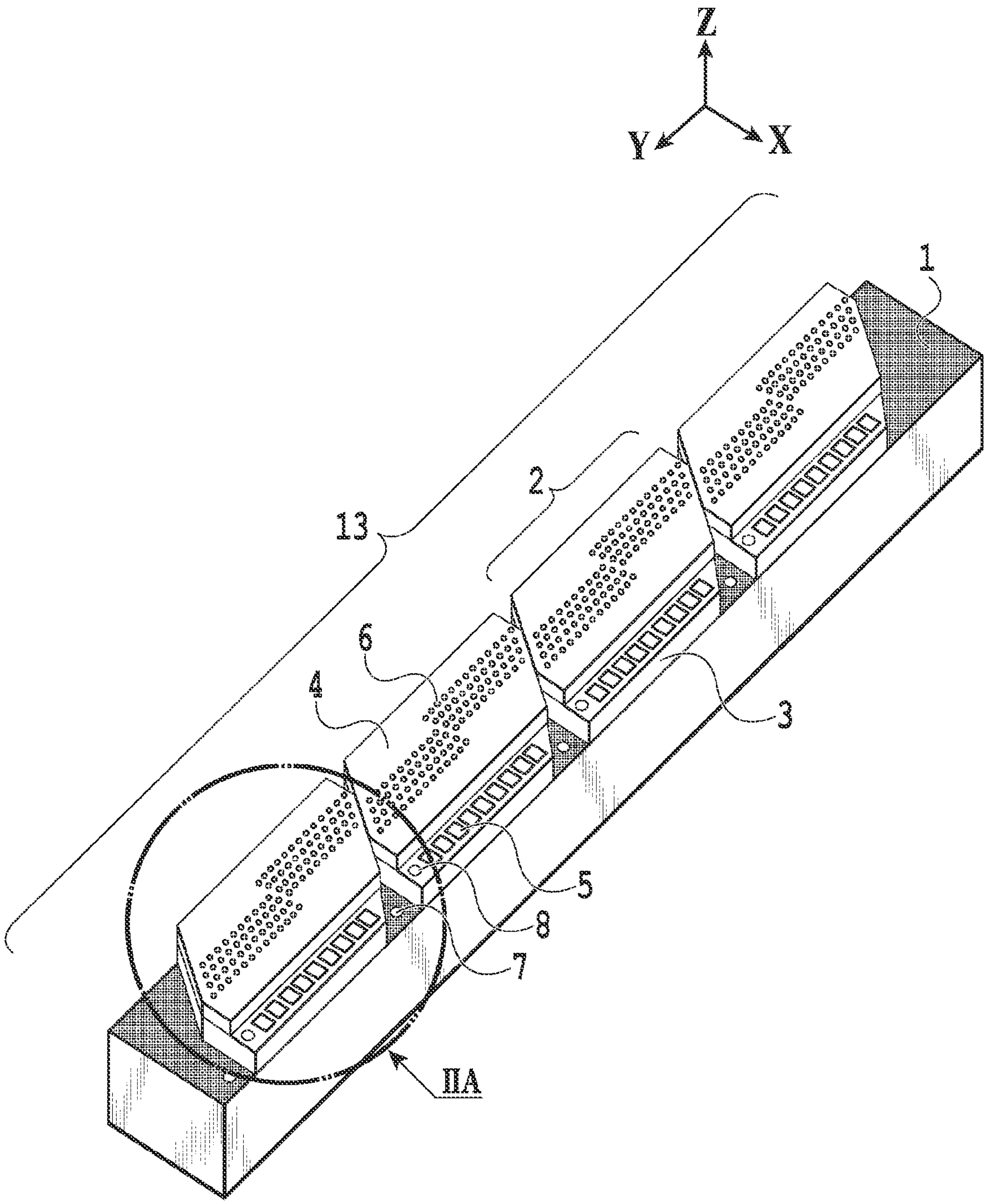
FIG. 1 is a perspective view showing an example of a liquid ejection head.

Embodiments will be described below with reference to the drawings. It is to be noted that the embodiments to be described below are appropriate specific examples and therefore involve various technically preferable limitations. However, the present disclosure is not limited to the embodiments in this specification or other specific methods. In the drawings, a three-dimensional XYZ coordinate system is depicted, with each of the X, Y, and Z axes or directions being perpendicular to the others. In the claims, A, B, and C directions are specific directions in a two-dimensional coordinate system. As an example, referring to the various embodiments described below and shown in the drawings, the direction A is parallel to the Y axis, and the direction B is parallel to the X axis. The direction C is defined as intersecting with the direction A and the direction B, but is within the two-dimensional coordinate system as it is used to define sides of a polygon shape.

Embodiment 1

FIG. 1 is a perspective view showing an example of a liquid ejection head 13 in the present embodiment. Abase plate 1 has a liquid flow path structure for supplying a liquid (e.g., ink) to device chips 2 from a tank (not shown). It is preferable that the base plate 1 be high in chemical resistance and thermal resistance, have insulating properties, and be high in mechanical strength. For example, the base plate 1 is made of a fine ceramic such as $Al_2O_3$ and a plastic such as phenolic resin, polycarbonate resin, or polyphenylene ether resin.

The device chips 2 are joined in a straight line to the upper surface of the base plate 1 with an adhesive agent (not shown in FIG. 1). FIG. 1 shows an example in which four device chips 2 are arrayed, but the number of device chips is not limited to four, and the number of device chips 2 may be any number greater than one. Also, first reference marks 7 are provided on the upper surface of the base plate 1.

Each device chip 2 comprises a substrate 3 and an ejection port forming member 4 on the upper surface of the substrate 3. The device chip 2 also comprises electrical connecting portions 5 and a second reference mark 8 in a region of the upper surface of the substrate 3 where the ejection port forming member 4 is not provided. A plurality of ejection ports 6 are formed in the ejection port forming member 4.

Figure 2A:
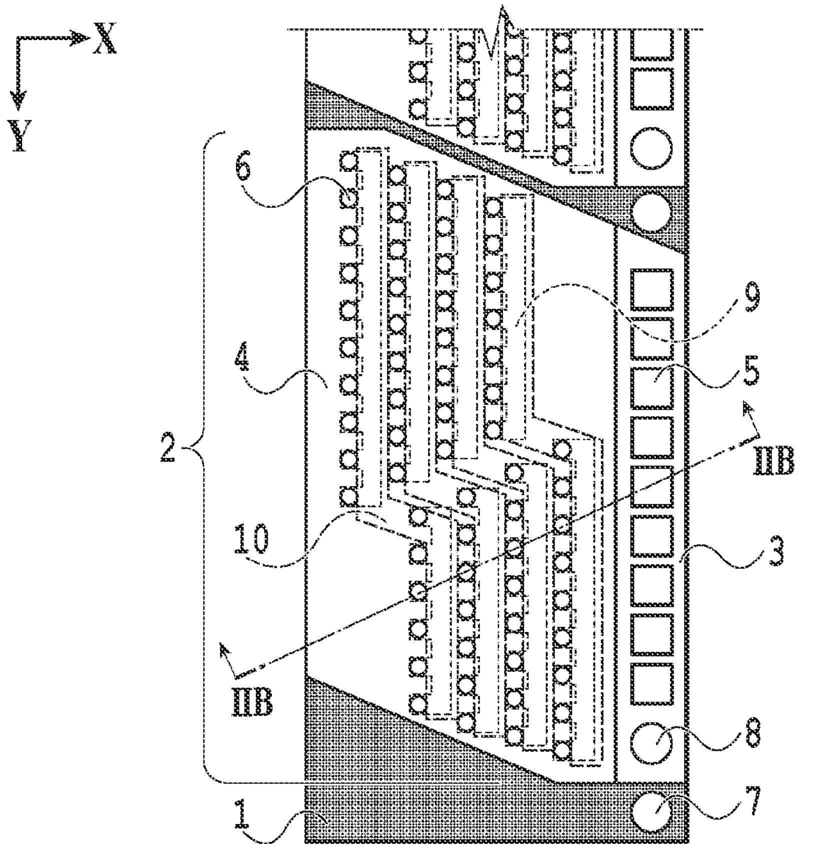
FIGS. 2A and 2B are views showing an example of device chips.
Figure 2B:
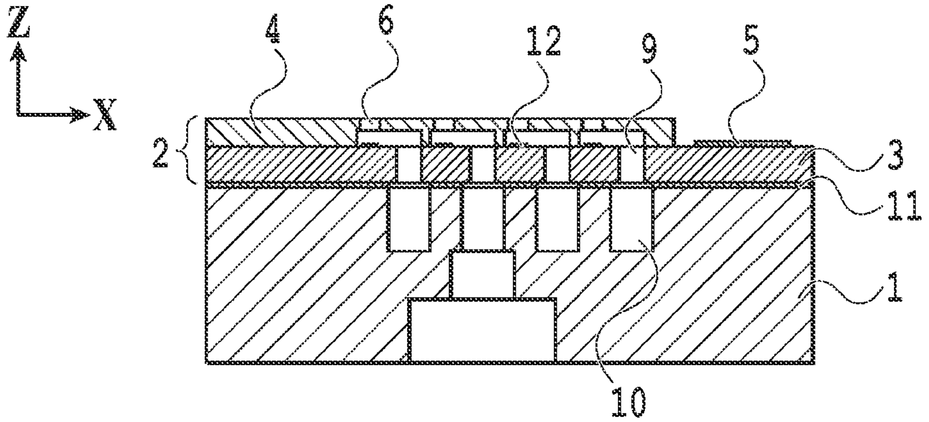

FIGS. 2A and 2B are views explaining the device chips 2 in the present embodiment. FIG. 2A is a top view of part IIA in FIG. 1. FIG. 2B is a schematic cross-sectional view along line IIB-IIB in FIG. 2A. In each device chip 2, on the substrate 3, incorporating energy generating elements 12 for ejecting the liquid, there are formed the ejection port forming member 4 for ejecting the liquid and the electrical connecting portions 5 for driving the energy generating elements 12. The substrate 3 is made of a semiconductor material such as Si, Ge, SiC, GaAs, InAs, GaP, diamond, ZnO, which is an oxide semiconductor, InN or GaN, which is a nitride semiconductor, a mixture of these or the like, or an organic semiconductor, for example. A publicly known element is usable as each energy generating element 12. Examples of the publicly known element include a heater element (heating resistance element), which uses thermal energy, a piezoelectric element, which uses mechanical energy, and so on. In the substrate 3, liquid supply ports 9 are formed through which a liquid such as ink is supplied to the ejection port forming member 4 from the base plate 1. Examples of the method of forming the liquid supply ports 9 include a method using etching such as dry etching or wet etching or laser ablation or the like to bore holes through the substrate 3. The ejection port forming member 4 has a three-dimensional structure comprising flow paths through which the liquid is caused to flow and the ejection ports 6. Examples of the material of the ejection port forming member 4 include an inorganic material such as Si, SiC, or SiO, and an organic material such as epoxy resin.

The shape of each device chip 2 is such that a space is formed between the adjacent device chips 2 in the state where they are arrayed. Assume for example a case where a first device chip and a second device chip are arrayed in a line in the array direction in which the device chips are arrayed. The device chips 2 in the present embodiment are shaped such that a clearance is formed in at least one region between the first device chip and the second device chip. Forming such a clearance makes part of the surface of the base plate 1 visible through the clearance in a case where the device chips 2 are viewed from their upper surfaces. The first reference marks 7 are disposed on this part of the surface of the base plate 1. This allows positioning using the reference marks (first reference marks 7) disposed on the base plate 1.

Figure 3C:
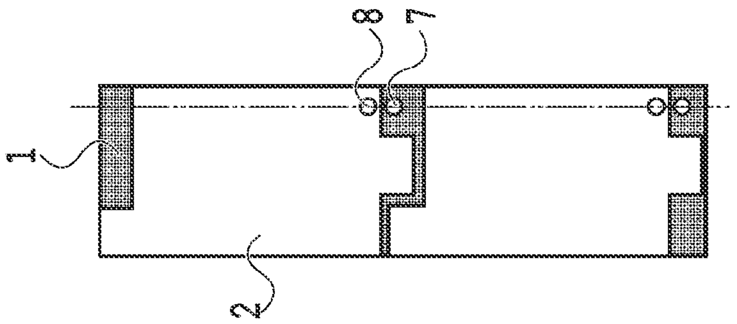
FIGS. 3A to 3C are views showing examples of the shape of the device chips.
Figure 3B:
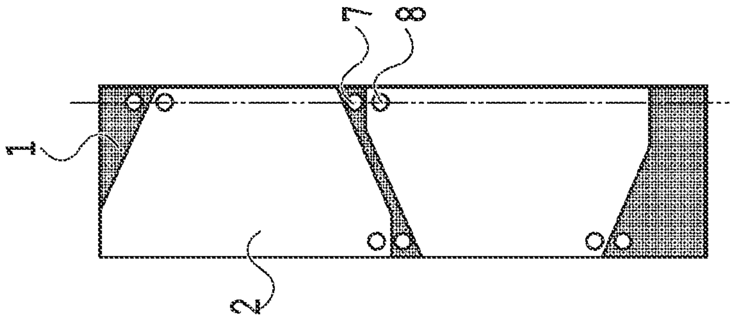
Figure 3A:
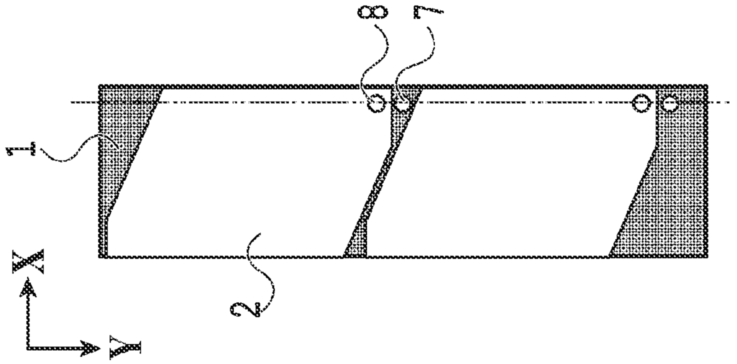

FIGS. 3A to 3C are views showing examples of the shape of the device chips 2. FIGS. 3A to 3C show examples of the shape of the device chips 2 as viewed from their upper surfaces. For example, as shown in FIG. 3A, each device chip 2 may have the shape of a parallelogram with its acute angle portions cropped. Although each device chip 2 has the shape of a parallelogram with both acute angle portions cropped in FIG. 3A, the shape may be such that only the acute angle portion on the side where the second reference mark 8 is disposed is cropped. As shown in FIG. 3B, each device chip 2 may have the shape of a trapezoid with its acute angle portions cropped. Although FIG. 3B shows an example where the second reference mark 8 is formed at each end in the horizontal direction in the drawing (X direction), the second reference mark 8 may be formed only at one end. In this case, the shape may be such that only the acute angle portion on the side where the second reference mark 8 is formed is cropped. Thus, the shape of each device chip 2 may be a polygonal shape with five or more corners.

Meanwhile, the shape of the device chips 2 in the present embodiment only need to be such that a space is formed between the adjacent device chips. Thus, the device chips 2 may be device chips of an unsymmetrical irregular shape as shown in FIG. 3C, for example. Moreover, the device chips may have different shapes. Assume also a case where a first device chip, a second device chip, a third device chip, and a fourth device chip are arrayed in this order. In this case, the first and fourth device chips as end sections in the array direction may have different shapes and the second and third device chips as non-end sections may have the same shape. Any shape or shapes may be employed as long as a space is formed between the adjacent device chips 2 in the state where they are arrayed.

Also, the ejection ports are preferably formed such that the ejection ports of the device chips 2 lying adjacent to each other in the state where the device chips 2 are disposed on the base plate 1 overlap each other in the array direction. In this way, in the liquid ejection head 13 with the device chips 2 disposed in the array direction, the ejection ports 6 overlap each other in the array direction between the adjacent device chips. Thus, at each region where adjacent device chips lie in proximity to each other, the liquid can be ejected from the ejection ports 6 of either device chip. This allows continuous ejection without a break in the array direction.

In the present embodiment, on the base plate 1, the first reference marks 7 are disposed, which are used for the positioning of the device chips 2 in disposing them. The first reference marks 7 are formed along the array axis along which the device chips 2 are disposed. The method of forming the first reference marks 7 includes a processing method using mold shaping, laser depiction, or the like in a case where the base plate 1 is made of a resin material, and a processing method using ultrasonic processing, metal transfer, or the like in a case where the base plate 1 is made of ceramic. The method only needs to be a processing method capable of accurately marking the first reference marks 7 on the base plate 1.

In the liquid ejection head 13 in the present embodiment, the second reference marks 8 on the device chips and the first reference marks 7, present in the spaces formed between the adjacently disposed device chips 2, are disposed on the array axis along which the device chips are arrayed. For example, in the present embodiment, the first reference marks 7 are disposed on the base plate 1 to be located in the spaces formed between the adjacently disposed device chips 2. To put it differently, the device chips 2 are formed in such a shape(s) so as not to cover the first reference marks 7, which are disposed on the base plate 1. In sum, the positions on the base plate 1 where the first reference marks 7 are disposed and the shape(s) of the device chips 2 are related to each other.

In the present embodiment, the second reference marks 8 are disposed on the device chips 2. The second reference marks 8 are marks for positioning relative to the first reference marks 7. The second reference marks 8 and the ejection ports 6 are accurately disposed on the device chips 2 since they are patterned by an apparatus for producing semiconductor devices. In the liquid ejection head 13 in the present embodiment, the second reference marks 8 and the first reference marks 7 are disposed on the array axis of the device chips 2. Specifically, the second reference marks 8 on the adjacent device chips 2 and the first reference marks 7 on the base plate are disposed on the array axis of the device chips 2. Also, in the present embodiment, the electrical connecting portions 5 are arrayed on the device chips 2 in the array direction of the device chips, and the second reference marks 8 are disposed on the array axis of these electrical connecting portions 5.

Note that the drawings in the present embodiment show an example where the shapes of the first reference marks 7 and the second reference marks 8 are circular shapes, but the shapes are not limited to circular shapes. The shapes may be cross shapes or patterns that are unlikely to be falsely recognized as patterns around them. Also, the shape of the first reference marks 7 and the shape of the second reference marks 8 may be the same shape or different shapes. Further, the plurality of first reference marks 7 may have the same shape or different shapes. Furthermore, the plurality of second reference marks 8 may have the same shape or different shapes.

FIGS. 4A to 4D are views explaining a process for producing the liquid ejection head 13 in the present embodiment. The process proceeds from FIG. 4A to FIG. 4D. The base plate 1 comprises flow paths 10 through which the liquid is supplied to the ejection ports 6 from the tank.

Figure 4D:
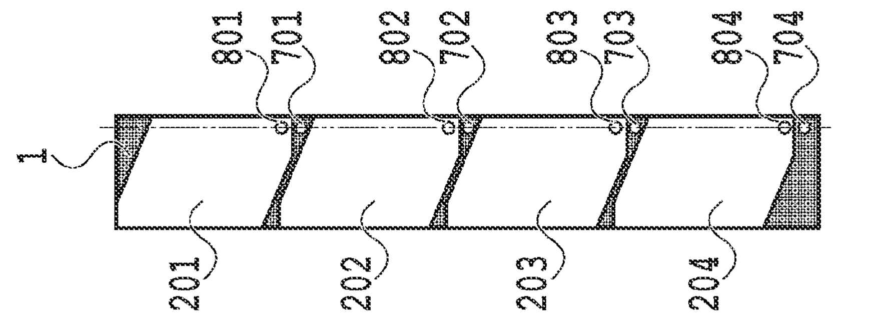
FIGS. 4A to 4D are views explaining a process for producing the liquid ejection head.
Figure 4C:
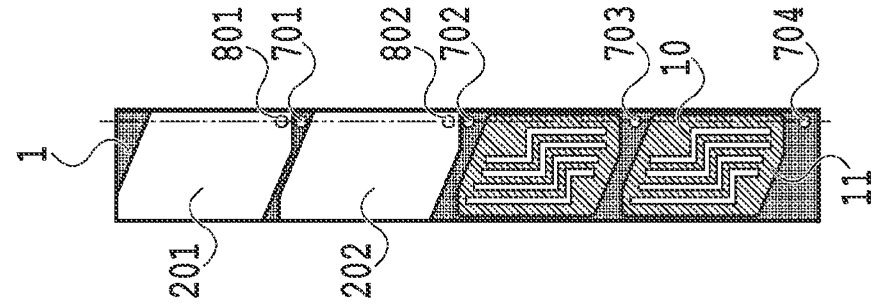
Figure 4B:
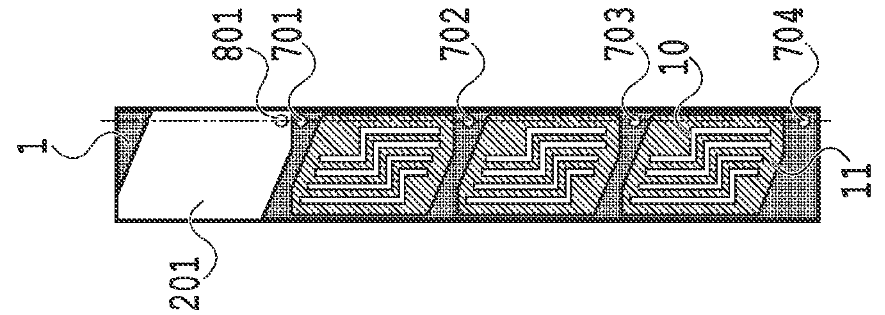
Figure 4A:
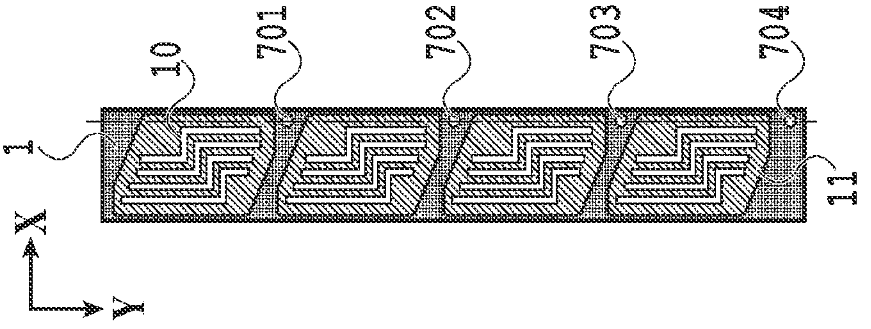

As shown in FIG. 4A, a step of applying an adhesive agent 11 to the base plate 1 while avoiding reference marks 701, 702, 703, and 704 disposed on the base plate 1 and the flow paths 10 is performed. Specifically, the amount and the regions in which the adhesive agent 11 is applied are adjusted such that the adhesive agent 11 does not form a link across any of the flow paths 10 or close any of the flow paths. Examples of the method of applying the adhesive agent 11 include a method of applying the adhesive agent 11 with a nozzle dispenser, a roller, a stamper, or the like. The adhesive agent 11 includes a thermosetting adhesive agent, a UV curable adhesive agent, or the like.

Then, as shown in FIG. 4B, a step of joining a device chip 201 to the base plate 1 in a chip mounter is performed. In doing so, positioning using the reference mark 701 on the base plate 1 and a reference mark 801 on the device chip 201 is performed. In the present embodiment, the positioning of the reference mark 701 and the reference mark 801 is performed by image recognition using a camera. Hence, the device chip 201 is accurately joined onto the adhesive agent 11. In the present embodiment, for accurate joining, a positioning process is performed within a single screen with a single camera for the image recognition. The positioning needs to be performed such that the liquid supply ports 9 in the substrate 3 are positioned on the corresponding flow paths 10 in the base plate 1, as shown in FIGS. 2A and 2B. In view of accuracy, it is preferable to dispose the reference mark 701 on the base plate 1 and the reference mark 801 on the device chip 201 such that the reference marks 701 and 801 can be positioned within a close range. As a result, the step of joining the device chip 201 at an end section in the array direction is completed, as shown in FIG. 4B.

Then, as shown in FIG. 4C, a step of joining a device chip 202 to be adjacent to the device chip 201 is performed. Firstly, the device chip 202 is picked up. Thereafter, in the chip mounter, the device chip 202 is accurately joined by positioning with image recognition performed by detecting a reference mark 802 on the device chip 202 while detecting the reference mark 702 on the base plate 1. In view of positioning accuracy, it is preferable to also detect the reference mark 801 on the device chip 201 in the present step. In the present production process, the device chips are joined one by one in the chip mounter, but the plurality of device chips may be simultaneously mounted and joined with a plurality of mount fingers in order to increase the throughput. In doing so, a method may be used in which the first reference marks 7 on the base plate 1 are detected and the device chips 2 are positioned simultaneously to shorten the process time.

Then, as shown in FIG. 4D, like the steps so far, steps of joining device chips 203 and 204 to the base plate 1 in the chip mounter are performed.

Lastly, electric wiring members for driving the energy generating elements are electrically joined (not shown) to the electrical connecting portions 5 formed on the device chips 201, 202, 203, and 204. As a result, the liquid ejection head 13 is completed.

As described above, the device chips 2 in the present embodiment are configured in such a shape(s) that a space is formed between the adjacent device chips. Moreover, the first reference marks 7 are disposed on the base plate 1 at positions corresponding to these spaces. The first reference marks 7 are disposed on an array axis. The second reference marks 8 are disposed on the device chips 2. Further, in joining the device chips 2 to the base plate 1, they are positioned relative to each other on the array axis by using the first reference marks 7 and the second reference marks 8.

In the present embodiment, since the positioning is performed on the array axis by using the first reference marks 7 and the second reference marks 8, as described above, accurate positioning is achieved. By positioning the second reference marks 8 on the device chips relative to the first reference marks 7 on the base plate as in the present embodiment, accurate positioning is achieved as compared to relative positioning in which the second reference marks 8 are positioned relative to each other. Also, by positioning the second reference marks 8 relative to the first reference marks 7, which are disposed on the array axis, accurate positioning without displacement from the axis is achieved as compared to a case where, for example, the reference marks are disposed in a direction orthogonal to the array direction (the width direction of the liquid ejection head 13). Also, since the device chips 2 in the present embodiment have such a shape(s) that a space is formed between the adjacent device chips, the device chips other than the device chips located at the end sections in the array direction are also positioned relative to the corresponding first reference marks 7, which are disposed on the array axis. Hence, accurate positioning is achieved.

Embodiment 2

In embodiment 1, a description has been given a liquid ejection head in which device chips are arrayed in a line in the print width direction (Y axis). In embodiment 2, a description will be given of a liquid ejection head in which device chips are arrayed in a matrix in both the print width direction (Y axis) and a direction orthogonal to the print width direction (X axis). The production process is substantially the same as that in embodiment 1, and therefore the difference will be mainly described below.

Figure 5:
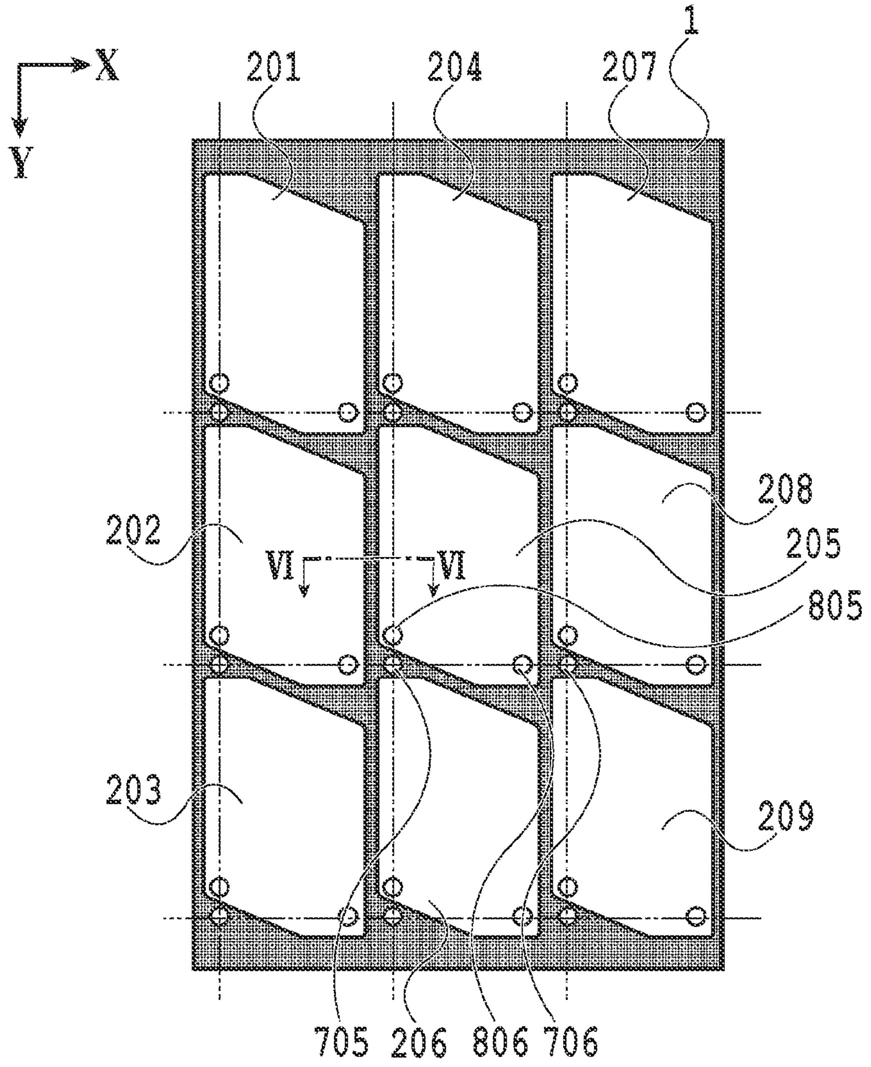
FIG. 5 is a view showing an example of device chips.

FIG. 5 is a view explaining the device chips in the present embodiment. Device chips 201 to 209 are joined in a matrix to the upper surface of a base plate 1 with an adhesive agent (not shown in FIG. 5). FIG. 5 shows an example in which nine device chips are disposed on the base plate 1, but the number of device chips is not limited to nine and may be any number. Each device chip in the present embodiment has such a shape that a space is formed between itself and each of the adjacent chips on the upper, lower, right, and left sides. The method of disposing the device chips onto the base plate is similar to that in embodiment 1. The device chips 201 to 209 in the present embodiment can each be positioned relative to a first reference mark disposed on an array axis in the print width direction (Y axis, first direction) and then further positioned relative to a first reference mark disposed on an X axis (second direction). For example, a plurality of second reference marks are disposed on each device chip. One second reference mark can be positioned relative to the first reference mark disposed on the Y axis on the base plate 1, and another second reference mark can be positioned relative to the first reference mark disposed on the X axis. Specifically, the device chip 205 in FIG. 5 can be positioned using a reference mark 805 and a reference mark 705 and positioned using a reference mark 806 and a reference mark 706.

Since the device chips 201 to 209 in the present embodiment are disposed in a matrix, their electrical connecting portions 5 are configured as back surface electrodes disposed on the back surface sides of the device chips.

Figure 6:
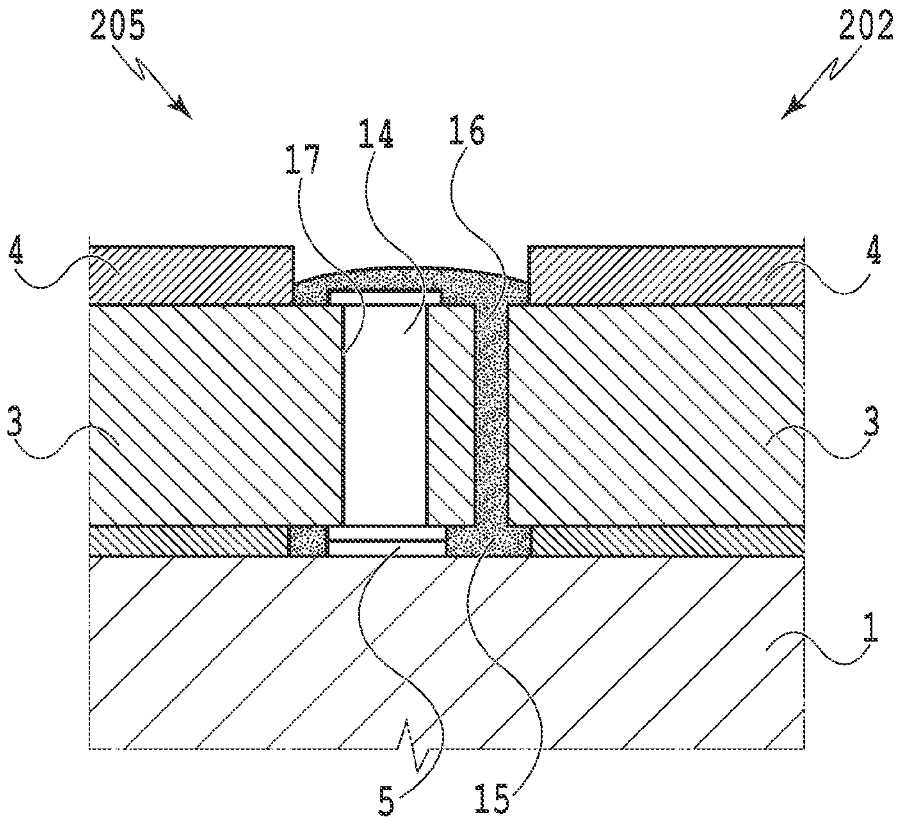
FIG. 6 is a schematic view showing a cross-section along line VI-VI in FIG. 5.

FIG. 6 is a view schematically showing a cross-section along line VI-VI in FIG. 5. The method of disposing the electrical connecting portions 5 on the back surface side of the substrate 3 includes a method involving: providing through holes 17 in the substrate 3; forming an insulation layer on the side surfaces of the through holes 17; and forming plugs 14 as electric wirings in the through holes 17.

The method of forming the through holes 17 includes etching such as drying etching or wet etching, laser ablation, and the like. The insulation layer is made of a film of an oxide such as $SiO_2$ or TiO, for example. The method of forming the insulation layer can include LP-CVD, which is a chemical vapor deposition method, ALD, which is an atomic deposition method, and the like. The plugs 14 are made of a metal such as Cu, Al, or Au. The method of forming the plugs 14 includes a method involving: burying their material in the through holes by plating, sputtering, or the like; and then polishing the back face surface side of the substrate by CMP or the like. Prior to forming the plugs 14, a barrier layer to prevent diffusion of Cu may be formed on the insulation film. Depending on the electrical connection, a step of exposing the plug electrodes by performing a thinning process on the back surface by dry etching, wet etching, or the like may be performed.

In electrically joining the device chips, electric wiring members are disposed on the base plate 1. In order to prevent electric short circuit and the like and avoid contact with a liquid such as ink after the device chips are electrically joined, a sealing agent 15 is injected around the electrical connecting portions 5 from a space 16 between the adjacent device chips. In doing so, the amount and duration of injection of the sealing agent are adjusted such that the sealing agent does not seal the ejection ports 6 in FIGS. 2A and 2B and buries the side surfaces of the adjacent device chips by capillarity. Consequently, the electrical connecting portions 5 are covered with the sealing agent 15. As a result, the liquid ejection head is completed.

As described above, even in the case of producing a liquid ejection head in which device chips are arrayed in a matrix, the device chips are accurately positioned and disposed on a base plate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-166888 filed Sep. 6, 2018, which is hereby incorporated by reference herein in its entirety.

What is claimed is:

1. A liquid ejection unit comprising:
an ejection port array including a plurality of ejection ports for ejecting liquid;
piezoelectric elements for ejecting liquid through the ejection ports;
a liquid flow path for supplying liquid to the piezoelectric elements; and
a positioning portion,
wherein the liquid ejection unit has a polygonal shape with at least five corners as viewed from a side where the ejection ports are provided,
wherein the polygonal shape includes:
a first side;
a second side opposite and parallel to the first side;
a third side contiguous with the first side;
a fourth side contiguous with the second side and parallel to the third side;
a fifth side contiguous with the third side; and
a sixth side contiguous with the fourth side and opposite and parallel to the fifth side,
wherein the first side and the second side are offset from each other in a direction A, which is an extending direction of the first side and the second side,
wherein the third side and the fourth side extend in a direction B perpendicular to the direction A,
wherein the fifth side and the sixth side extend in a direction C intersecting with the direction A and the direction B,
wherein the fifth side is disposed at an acute angle relative to the first side,
wherein the positioning portion is disposed inside and adjacent to a corner formed by the first side and the third side, and
wherein the positioning portion overlaps with the ejection port array as viewed in the direction B.

2. The liquid ejection unit according to claim 1, further comprising a liquid supply port,
wherein the liquid ejection unit is formed with an ejection port forming member in which the ejection ports are formed, a substrate in which the liquid supply port is formed, and a base plate in which the liquid flow path is formed therein, and
liquid is supplied from the liquid flow path to the ejection ports via the liquid supply port.

3. The liquid ejection unit according to claim 1, further comprising an ejection port forming member in which the ejection ports are formed,
wherein the material of the ejection port forming member includes an inorganic material selected from Si, SiC, or SiO.

4. The liquid ejection unit according to claim 1, wherein the third side and the fourth side do not overlap as viewed in the direction A.

5. The liquid ejection unit according to claim 1, wherein the first side and the second side have portions that overlap each other as viewed in the direction B.

6. The liquid ejection unit according to claim 1, wherein the fifth side and the sixth side have portions that overlap each other as viewed in the direction A and do not overlap as viewed in the direction B.

7. The liquid ejection unit according to claim 1, wherein the third side and the fourth side do not overlap as viewed in the direction A, the first side and the second side have portions that overlap each other as viewed in the direction B, and the fifth side and the sixth side have portions that overlap each other as viewed in the direction A and do not overlap as viewed in the direction B.

8. The liquid ejection unit according to claim 1, further comprising an electrical connecting portion disposed on a back side relative to the surface on which the ejection ports are provided.

9. A liquid ejection unit comprising:
an ejection port for ejecting liquid;
a piezoelectric element for ejecting liquid through the ejection port;
a liquid flow path for supplying liquid to the piezoelectric element; and
a positioning portion,
wherein the liquid ejection unit has a polygonal shape with at least five corners as viewed from a side where the ejection port is provided,
wherein the polygonal shape includes:
a first side;
a second side opposite and parallel to the first side;
a third side contiguous with the first side;
a fourth side contiguous with the second side and parallel to the third side;
a fifth side contiguous with the third side; and
a sixth side contiguous with the fourth side and opposite and parallel to the fifth side, wherein the first side and the second side are offset from each other in a direction A, which is an extending direction of the first side and the second side, wherein the third side and the fourth side extend in a direction B perpendicular to the direction A, wherein the fifth side and the sixth side extend in a direction C intersecting with the direction A and the direction B, wherein the fifth side is disposed at an acute angle relative to the first side, wherein the positioning portion is disposed inside and adjacent to a corner formed by the first side and the third side, and wherein the positioning portion overlaps with the liquid flow path as viewed in the direction B.

* * * * *